(No Model.) 3 Sheets—Sheet 1.
H. J. GRAY.
PHOTOGRAPHIC CAMERA.

No. 440,427. Patented Nov. 11, 1890.

Witnesses: Inventor
Henry John Gray (No Model.) 3 Sheets—Sheet 2.
H. J. GRAY.
PHOTOGRAPHIC CAMERA.
No. 440,427. Patented Nov. 11, 1890.
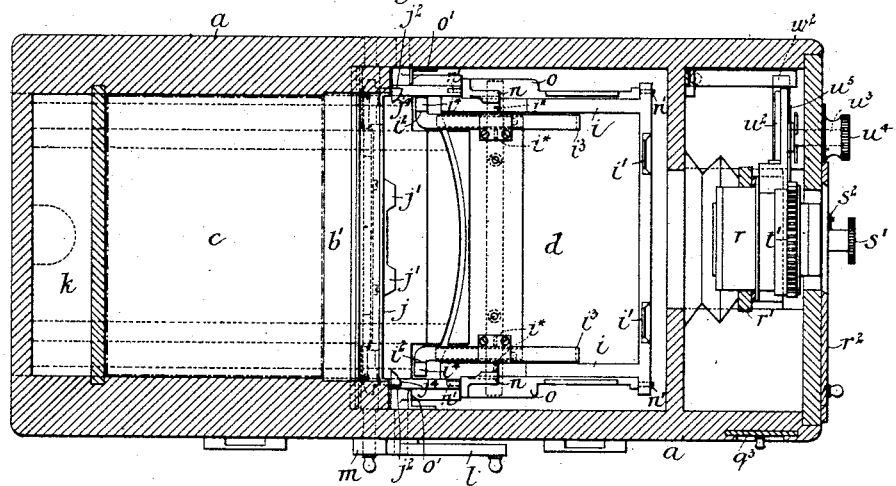
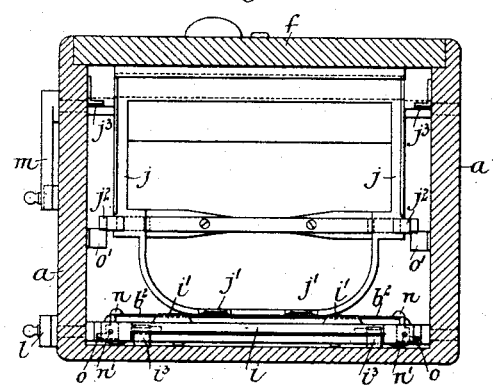
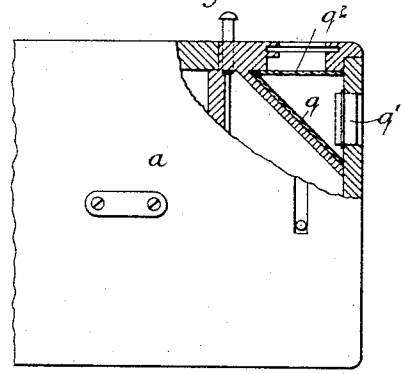
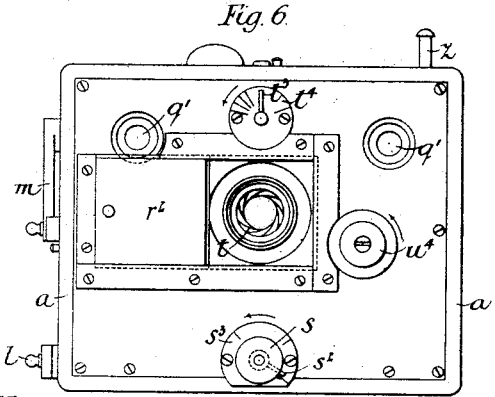
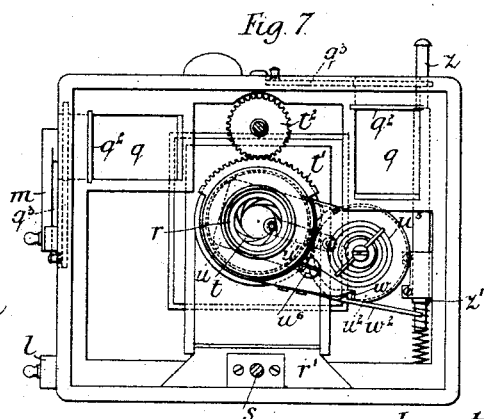
Witnesses: Inventor.
Henry John Gray
By his Atty.

(No Model.) 3 Sheets—Sheet 3.
H. J. GRAY.
PHOTOGRAPHIC CAMERA.
No. 440,427. Patented Nov. 11, 1890.
Fig. 9.
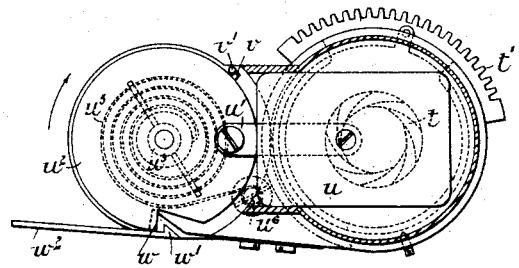
Fig. 10.
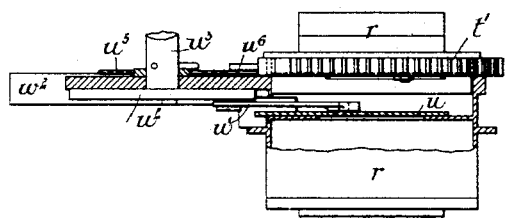
Fig. 11. Fig. 12.
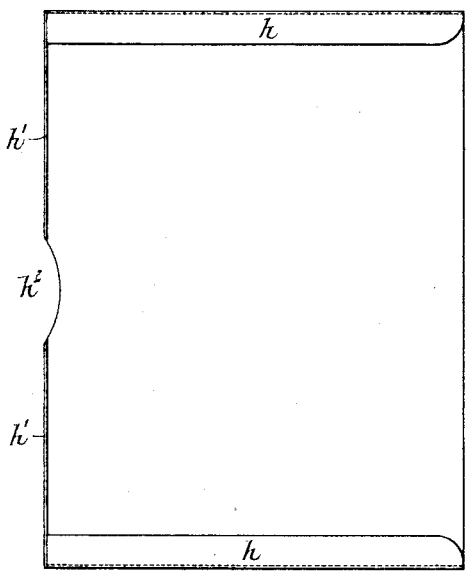 
Fig. 13.
Witnesses. Inventor.
L. P. Whitaker Henry John Gray
C. S. Clarkson By his Attys
Whitaker + Prevost

UNITED STATES PATENT OFFICE.

HENRY JOHN GRAY, OF LONDON, ENGLAND.

PHOTOGRAPHIC CAMERA.

SPECIFICATION forming part of Letters Patent No. 440,427, dated November 11, 1890.

Application filed December 19, 1889. Serial No. 334,304. (No model.)

*To all whom it may concern:*

Be it known that I, HENRY JOHN GRAY, a subject of the Queen of Great Britain, residing at London, England, have invented new and useful Improvements in and Relating to Photographic Cameras, of which the following is a specification.

My invention relates to photographic cameras, and has for its object to provide an improved camera which is especially adapted for use by detectives, and which is more compact than cameras of the same kind as heretofore constructed.

According to my said invention the box of the camera is divided by a partition into two compartments, one of which forms the camera proper, while the other serves for the reception of plates, papers, or other media for carrying sensitized surfaces. The said plates or the like are arranged to lie horizontally one upon another in a stack and are successively transferred from the bottom of the stack into position for the exposure and thence to the top of the stack. The transfer is effected by means of two pivoted lever-carriers and a slide or plunger. The said slide or plunger serves to push the lowermost plate of the stack onto the first lever-carrier, which latter then delivers the plate onto the second lever-carrier into position for the exposure. After the exposure the second lever-carrier is operated to return the plate to the top of the stack. The lever-carriers are provided with spring-clips for holding the plates thereon. In order to prevent the films of the plates or the like from being rubbed, the said plates or the like are carried in frames or holders.

To enable my invention to be fully understood, I will describe the same with reference to the accompanying drawings, in which—

Figure 1:
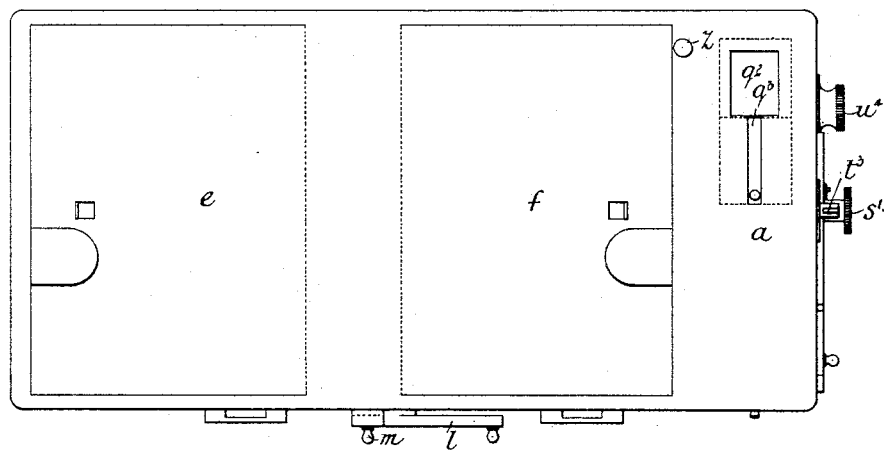
Figure 2:
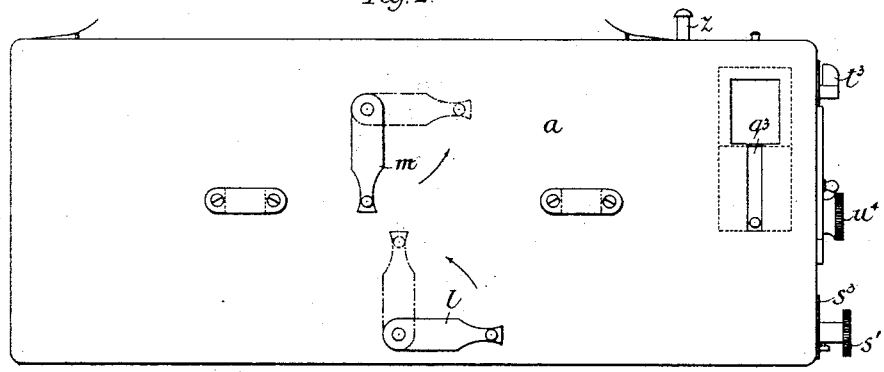
Figure 3:
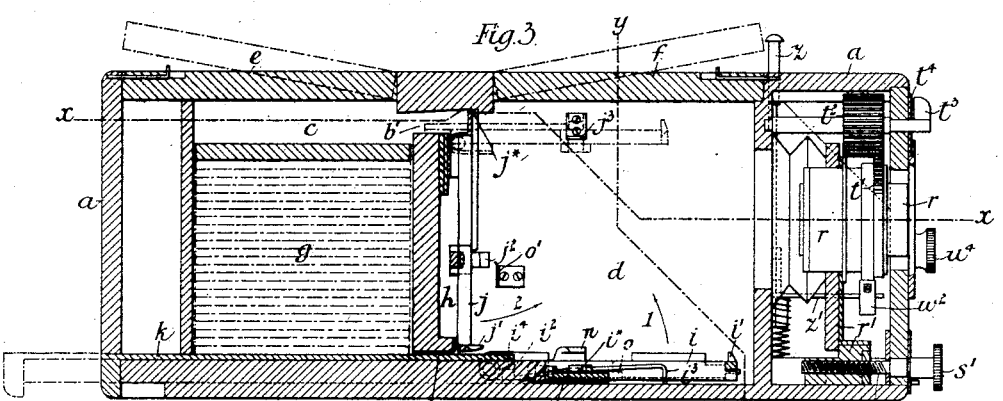

Figure 1 is a plan or top view of my improved camera. Fig. 2 is a side elevation, and Fig. 3 is a longitudinal vertical central section of the same. Fig. 4 is a section on the line $x$ $x$, Fig. 3; and Fig. 5 is a section on the line $y$ $y$, Fig. 3. Fig. 6 is a front elevation of the camera; and Fig. 7 is a similar view to Fig. 6, but with the front part of the outer casing removed. Fig. 8 is a side view of the front portion of the camera, a part of the outer casing being removed to show the parts behind it. Figs. 9 to 13 are views of details, hereinafter referred to.

$a$ is the external box or casing, which is divided by the partition $b$ into two compartments $c$ $d$ and provided with the doors $e f$ for affording access to the interiors of the said compartments.

$g$ indicates the stack of sensitized plates or the like arranged in the compartment $c$, which plates are successively transferred from the bottom of the stack through the slit $b^2$ in the partition into position for exposure, and then returned through the slit $b'$ to the top of the said stack.

In order to prevent the films of the sensitized plates or the like from being rubbed, the said plates are carried in frames or holders—for instances, such as are shown in Figs. 11, 12, and 13, which are respectively a plan, front elevation, and central section of a holder. This holder, preferably, is composed of sheet metal, the side edges being bent over, as indicated at $h$, Fig. 11, so as to form grooves in which the edges of the sensitized plate can slide. The rear edge $h'$ of the holder is also bent up to form a stop for the sensitized plate to abut against when slid into place, a space $h^2$ being left, however, to enable the sensitized plate to be pushed out from the holder. The plates are introduced into this holder so that the sensitized surface is adjacent to the edges $h$ $h$, the latter thus forming distance-pieces for preventing the holder of another plate from coming into contact with the sensitized surface. In order to hold the sensitized plates firmly, each holder is slightly curved so as to press against the unsensitized side of the plate, and thereby press it against the edges $h$ of the said holder. This is clearly shown at Fig. 12, the dotted lines representing the sensitized plate.

The transfer of the plates from the bottom of the stack into position for exposure and their return to the top of the stack is effected by means of the two pivoted lever-carriers $i$ $j$ and the slide or plunger $k$, the said slide or plunger being arranged, as shown in Fig. 3, at the bottom of the chamber $c$. When the plunger is drawn outward, it allows the stack of plates to drop, so that the lowermost plate comes in front of the said plunger. When, therefore, the plunger is pushed back, it is obvious that the plate in front of it is pushed forward out of the chamber $c$ through the slit $b^2$ into the chamber $d$.

The carriers $i j$ are adapted to be operated from the exterior of the apparatus by means of levers $l$ $m$, respectively. The carrier $i$ when in its normal position is adapted to lie with its upper surface in the same plane as the bottom of the compartment $c$, so that as a plate is pushed from the bottom of the said stack into the compartment $d$ it will slide onto the said carrier. This carrier, which is shown in plan in Fig. 4, is provided at its front ends with lugs $i'$ $i'$, against which the plates abut when they are moved forward by the slide $k$, and at the sides with spring clips or catches $n$ $n$, Figs. 3, 4, and 5, beneath which the edges of the plate-holder slide. These catches are pivoted to the carrier $i$ at $n'$ $n'$, as shown most clearly in Figs. 4 and 5, and each is provided on its rear side with a tappet $o$, which, when the carrier is moved in the direction of the arrow 1, Fig. 3, to deliver a plate onto the carrier $j$, impinge against lugs $o'$ $o'$, attached to the interior of the case $a$, so that the catches $n$ $n$ are disengaged from the plate, the latter being then free to be delivered onto the said carrier $j$. The catches $n$ are also provided with flanges $n^2$ $n^2$, which assist in guiding the sensitized plate when delivered onto the carrier $i$. In order to prevent the sensitized plate from dropping out of the carrier $i$ when it is moved, as described, I provide two spring-catches $i^2$, pivoted at $i^*$ to the said carrier, the end $i^3$ of each of which is bent down, so that when the carrier is in the position shown in Fig. 3 the said bent ends $i^3$ bear upon the floor of the compartment $d$, and thus maintain the catches below the level of the under surface of the plate to be introduced into the said carrier. When, therefore, the carrier provided with a plate is moved, as previously described, the bent ends of the catches are moved out of contact with the floor of the compartment $d$, thereby allowing the said catches to move up behind the rear edge of the plate, and thus hold it in position. In case the carrier $i$ should be not quite horizontal the catches $i^2$ would lie in front of the sensitized plate to be introduced. I therefore provide for depressing the said catches by forming them with inclined surfaces $i^4$, against which the edges of the plate-holders impinge as they are pushed onto the carrier.

The construction of the carrier $j$ is somewhat similar to that of the carrier $i$, it being provided at its free end with lugs $j'$ (the said lug, however, in the present case serving to support the plate during exposure) and with spring clips or catches $j^2$, adapted to be operated by impingement against lugs $j^3$.

The operation of this part of my apparatus is as follows: Assume the compartment $c$ to contain a stack of sensitized plates. If, now, the slide $k$ is pulled backward sufficiently far the stack drops, so that on the return of the said plunger or slide the lowermost plate will be pushed forward onto the carrier $i$. The said carrier is then moved by means of the lever $l$ in the direction indicated by the arrow 1, Fig. 3, so that the plate is delivered onto the carrier $j$, the spring-catches $j^2$, which are provided with inclined surfaces $j^4$, Fig. 4, being forced apart by pressing the said plate against them, as shown. The carrier $i$ is then returned to its normal position. After the plate has been exposed the carrier $j$ is moved by means of the lever $m$ in the direction indicated by the arrow 2, Fig. 3, into the position indicated by the dotted lines. If, now, the camera is tipped backward, the plate will slide off the said carrier through the slit $b'$ in the partition $b$ onto the top of the stack. The carrier $j$ is then returned to its normal position, (indicated by the full lines in Fig. 3,) ready to receive another plate from the carrier $i$. The carrier $j$ is also provided with an upward extension $j^*$, which, when the said carrier is in position for exposing a plate, closes the slit $b'$ in the top of the partition, and so excludes light from the compartment $c$, the said extension shutting into a rabbet.

As with my improved camera it is not possible to adjust the picture on the plate in the ordinary manner, I provide small reflectors—one on the top of the camera, as in Fig. 1, and one on the side, as in Fig. 2, so as to enable me to place the picture either lengthwise or across the plate. Each of these reflectors consists of a mirror $q$, a lens $q'$, and a screen $q^2$, all as shown in Fig. 8 and as well known.

$q^3$ are sliding shutters for covering the screens $q^2$ when not in use. I also advantageously provide my camera with a lens $r$, arranged, as shown in Figs. 3 and 4, behind the end of the case or box $a$, so that it will not be liable to damage when being transported. This lens is carried by a sliding support $r'$, Figs. 3 and 7, which is designed to be moved to and fro for focussing purposes by means of the screw $s$, actuated by a knob $s'$, provided with a pointer $s^2$, working over a dial $s^3$, so that the focus can be adjusted.

$r^2$ is a sliding shutter on the exterior of the front of the apparatus for covering the lens when not in use. In conjunction with the lens I also advantageously arrange an "iris-diaphragm" $t$, the ring of which is provided with teeth $t'$, with which engages a pinion $t^2$, operated by a lever $t^3$ on the exterior of the casing, so that by rotating the said pinion $t^2$ the diaphragm can be opened or closed more or less, as desired. The teeth of the pinion $t^2$ are made sufficiently long, as shown in Fig. 3, to prevent the teeth $t'$ from being disengaged from the pinion when the lens $r$ is having the focus adjusted. In conjunction with the lever $t^3$, I advantageously arrange a small dial $t^4$, by means of which the diaphragm can be accurately adjusted. In conjunction with the lens $r$, I also arrange an instantaneous shutter. The shutter which I preferably employ is shown in Figs. 9 and 10, drawn to an enlarged scale, which figures are respectively a rear sectional elevation and sectional plan of the shutter and lens combined.

$u$ is the shutter proper, which is connected by a rod $u'$ with a disk $u^2$, adapted to be rotated from the exterior of the apparatus through the medium of the spindle $u^3$, provided with the knob $u^4$, as shown at Fig. 6. In combination with the disk $u^2$ is also arranged a spiral spring $u^5$, one end of which is attached to the spindle of the disk and the other to a fixed point $u^6$, so that when the disk is rotated the said spring will be coiled. On the edge of the disk is placed a pin $v$, which is designed to impinge against a stop $v'$, to prevent the disk from being moved too far in either direction, and in the edge of the disk is formed a notch $w$, with which a catch $w'$, formed on a spring-arm $w^2$, is designed to engage. In connection with the end of the spring-arm $w^2$ is a spring push-rod $z$, Figs. 3 and 7, having an arm $z'$, designed to act upon the free end of the said spring-arm $w^2$, so that when the push-rod is depressed the catch $w'$ will be moved out of engagement with the notch in the disk $u^2$.

The shutter in its normal position is located in front of the lens $r$, as shown in Figs. 9 and 10. In order to set the shutter, the disk $u^2$ is rotated in the direction of the arrow, Fig. 9, one complete revolution, so that the spring is coiled, it being held in this position by the catch $w'$ in Fig. 9, and during this rotation of the disk the shutter is moved away from the lens and back to its normal position. If, now, the spring-arm $w^2$ is depressed by acting upon the push-rod $z$, the spring $u^5$ will cause the rotation of the disk, whereby the shutter will be momentarily moved from the front of the lens to expose the plate, and then returned to its normal position.

Having now particularly described and ascertained the nature of my said invention and in what manner the same is to be performed, I declare that what I claim is—

1. A camera provided with an exposing-chamber, a plate-receptacle separated therefrom by a partition, and a pivoted carrier adapted to receive a plate from the plate-receptable and hold it in range of the lens and to move on its pivot as an axis to carry said plate into position to be returned to a different part of the plate-receptacle, substantially as described.

2. In a camera, the combination, with a plate-receptacle and an exposing-chamber separated therefrom by a partition, of an aperture below said partition for the passage of plates from one chamber to the other, a similar aperture above said partition, and a carrier pivoted near the lower edge of said upper aperture and adapted to receive a plate and hold it in range of the lens and to swing said plate into position to be returned through the upper aperture, substantially as described.

3. In a camera, the combination, with a plate-receptacle, of a carrier adapted to receive plates from the same and a second carrier adapted to receive plates from the first carrier and return them to the plate-receptacle when exposed, substantially as described.

4. In a camera, the combination, with a plate-receptacle, of a pivoted carrier adapted to receive plates from the said receptacle, a second pivoted carrier for receiving plates from the first carrier and returning them to the plate-receptacle, and means for operating said carriers, substantially as described.

5. In a camera, the combination, with the plate-receptacle, of a pivoted lever-carrier adapted to receive plates from the said receptacle, a second pivoted lever-carrier within the range of the lens for receiving plates from the first carrier and returning them to said plate-receptacle, means for operating the said carriers from the outside of the camera, and means for supplying plates to said first carrier, substantially as described.

6. In a camera, the combination, with the plate-receptacle, of a carrier adapted to receive plates from said receptacle, a plunger for supplying plates to said carrier, a second carrier in range of the lens adapted to receive plates from the first carrier and return them to the plate-receptacle, and means for operating said carriers from the outside of the camera, substantially as described.

7. In a camera, the combination, with the plate-receptacle provided with apertures for the egress and ingress of plates, of a plunger adapted to force out a single plate and close one of said apertures, a pivoted carrier for receiving and holding a plate in range of the lens, provided with a projecting portion for closing the other aperture, and means for conveying plates from the plunger to the said carrier, substantially as described.

8. In a camera, the combination, with the plate-receptacle, of movable carriers provided with movable projections for engaging the plates and rigid lugs on the walls of the camera for engaging and releasing said movable projections, substantially as and for the purpose set forth.

9. In a camera, the combination, with the plate-receptacle, of the pivoted carrier adapted to receive plates from the same and provided with a spring-actuated lug for engaging the foot of the plate, said lug having an operating-arm for engaging a rigid part and lowering said lug out of the path of the entering plate, substantially as described.

10. In a camera, the combination, with the lens and means for moving the same longitudinally, of an adjustable diaphragm for said lens, provided with a rack, and a pinion engaging said rack for operating the same, having a broad face, whereby said lens may be moved without disengaging said pinion from said rack, substantially as and for the purpose set forth.

11. In a photographic camera provided with two compartments, one of which serves as the exposing-chamber and the other as a receptacle for plates, the combination of a plunger adapted to push the lowermost plate out of the receptacle onto a lever-carrier and a second lever-carrier adapted to receive the plate from the first carrier to hold it in range of the lens during exposure and to move it into such position that it can be returned into the plate-receptacle, substantially as described.

HENRY JOHN GRAY.

Witnesses:
JOHN E. BOUSFIELD,
*Of the firm of G. F. Redfern & Co., Patent Agents, 4 South Street, Finsbury, London.*
A. S. ALBUTT.